US009461751B2

(12) United States Patent
Harley et al.

(10) Patent No.: US 9,461,751 B2
(45) Date of Patent: Oct. 4, 2016

(54) FREQUENCY DOMAIN MULTIPLEX OPTICAL TRANSMISSION

(71) Applicants: James Harley, Nepean (CA); Roger Carroll, Ottawa (CA); Shahab Oveis Gharan, Ottawa (CA); Kim B. Roberts, Ottawa (CA)

(72) Inventors: James Harley, Nepean (CA); Roger Carroll, Ottawa (CA); Shahab Oveis Gharan, Ottawa (CA); Kim B. Roberts, Ottawa (CA)

(73) Assignee: Ciena Corporation, Hanover, MD (US)

( * ) Notice: Subject to any disclaimer, the term of this patent is extended or adjusted under 35 U.S.C. 154(b) by 111 days.

(21) Appl. No.: 13/718,211

(22) Filed: Dec. 18, 2012

(65) Prior Publication Data

US 2014/0169793 A1  Jun. 19, 2014

(51) Int. Cl.
*H04B 10/548* (2013.01)
*H04B 10/40* (2013.01)
*H04B 10/61* (2013.01)

(52) U.S. Cl.
CPC ............ *H04B 10/548* (2013.01); *H04B 10/40* (2013.01); *H04B 10/616* (2013.01)

(58) Field of Classification Search
CPC ............. H04B 10/60–10/6973; H04B 10/516; H04B 10/50–10/5563
USPC .................. 398/79, 183, 202–204, 140–172
See application file for complete search history.

(56) References Cited

U.S. PATENT DOCUMENTS

| 5,416,628 | A * | 5/1995 | Betti et al. ............... 398/185 |
| 8,005,368 | B2 | 8/2011 | Roberts et al. |
| 2002/0030877 | A1 * | 3/2002 | Way et al. .................. 359/183 |
| 2002/0048314 | A1 * | 4/2002 | Moore, III ............ H04B 1/68 375/141 |
| 2007/0211788 | A1 * | 9/2007 | Fink et al. ................. 375/146 |
| 2009/0052556 | A1 * | 2/2009 | Fernandez ................ 375/241 |
| 2010/0189443 | A1 * | 7/2010 | Krause et al. ............. 398/115 |
| 2010/0220376 | A1 * | 9/2010 | Kobayashi et al. ........ 359/238 |
| 2013/0101290 | A1 * | 4/2013 | Anandarajah et al. ....... 398/49 |
| 2013/0183040 | A1 * | 7/2013 | Elahmadi .......... H04B 10/2507 398/79 |

OTHER PUBLICATIONS

Jansen, et al., "Coherent Optical 25.8-Gb/s OFDM Transmission Over 4160-km SSMF", Journal of Lightwave Technology, vol. 26, No. 1, pp. 6-16, Jan. 1, 2008.

* cited by examiner

*Primary Examiner* — David Payne
*Assistant Examiner* — Casey Kretzer
(74) *Attorney, Agent, or Firm* — Integral Intellectual Property Inc.; Miriam Paton (57) ABSTRACT

A method of transmitting a data signal in an optical communications system. The method includes processing the data signal to generate an analog drive signal, wherein the processing comprises applying a first non-linear operation such that frequency components of the drive signal lay in at least two separated spectral bands. An optical carrier light is modulated using the analog drive signal.

14 Claims, 9 Drawing Sheets

FREQUENCY DOMAIN MULTIPLEX OPTICAL TRANSMISSION

CROSS-REFERENCE TO RELATED APPLICATIONS

This is the first application filed in respect of the present invention.

FIELD OF THE INVENTION

The present application relates generally to optical communications systems, and more specifically to techniques for Frequency Domain Multiplex (FDM) optical transmission.

BACKGROUND

Figure 1:
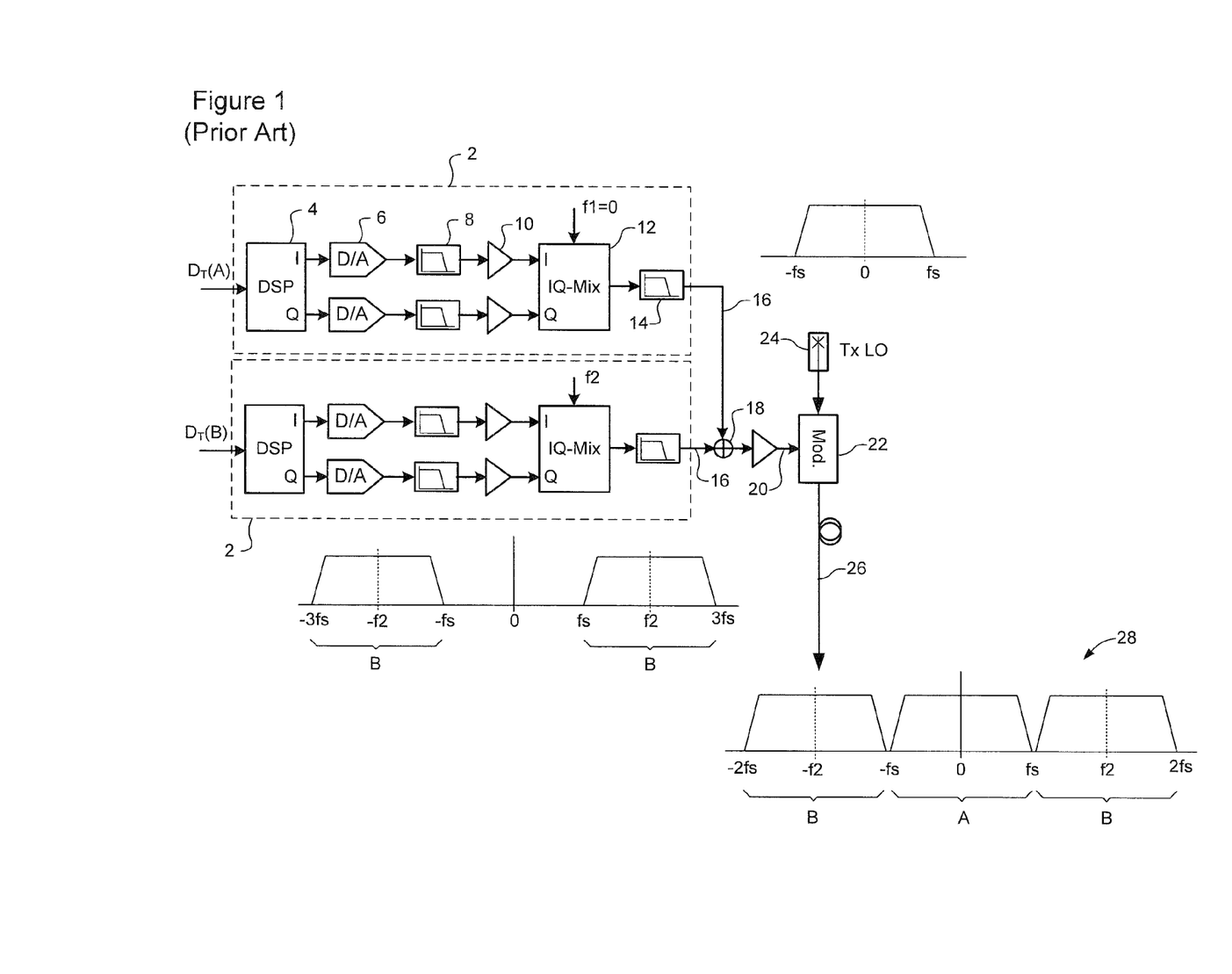
FIG. 1 is a block diagram schematically illustrating elements of an OFDM transmitter known in the art.

Orthogonal Frequency Domain Multiplexing (OFDM) is a technique known in the art. In general, OFDM involves up-converting two or more low-rate data signals to respective sub-bands of a high bandwidth transmission channel. FIG. 1 illustrates an OFDM transmitter for implementing this technique in an optical communications network, which is known from *Coherent Optical 25.8-Gb/s OFDM Transmission Over 4160-km SSMF*; Jansen et al., Journal of Lightwave Technology, Vol 26, No. 1, pp. 6-16, Jan. 1, 2008. As may be seen in FIG. 1, the transmitter comprises a pair of parallel transmission paths 2, each of which generates a respective sub-band (identified herein as sub-bands A and B) signal. Each path 2 comprises a digital signal processor 4 which generates parallel In-phase (I) and Quadrature (Q) sample streams based on a respective sub-band data signal ($D_T(A)$ and $D_T(B)$) to be transmitted. Each sample stream is processed by a respective Digital to analog (D/A) converter 6, low-pass filter 8, and an amplifier 10 to produce an analog signal that is supplied to an input of an IQ-mixer 12. The IQ mixer 12 operates to mix the analog I and Q signals with a mixing signal having a desired frequency (f1, f2) to yield a pair of Intermediate Frequency (IF) signals 14, which are then combined to produce a single analog signal 16 containing spectral components of both of the analog I and Q signals. The combined signal output from the IQ-mixer is then Low-Pass filtered (at 14) to generate an analog sub-band signal 16 having a spectrum centered at a desired IF. An analog summation block 18 combines the two sub-band signals to yield a single drive signal 20 that is supplied to an optical modulator 22 (such as a Mach-Zehnder modulator). The optical modulator 22 is responsive to the drive signal 20 to modulate a continuous wave (CW) carrier light from a transmitter Local Oscillator (Tx LO) 24 such as a laser to produce a modulated optical signal 26 for transmission through the communications system to a receiver.

Suitable selection of the mixing signal frequencies (f1 and f2) results in frequency-domain separation between the sub-bands in the modulated optical signal. In the example of FIG. 1, in path A the mixing signal frequency (f1) is zero, so that the analog sub-band signal 16 generated by path A is a baseband signal having a bandwidth fs corresponding to that of the sub-band data signal $D_T(A)$. On the other hand, in path B the mixing signal frequency (12) is selected to be f2≥2 fs, so that the analog sub-band signal generated by path B has a spectrum centered at a frequency of ±f2 and having a bandwidth fs corresponding to that of the sub-band data signal $D_T(B)$. With this arrangement, the optical signal output from the optical modulator 22 has a spectrum 28 in which frequency components of each sub-band lay in respective different spectral regions of the optical signal. Consequently, sub-bands A and B can be readily separated and processed in a receiver, using known techniques, to generate recovered sub-band data signals $D_R(A)$ and $D_R(B)$ corresponding to the transmitted sub-band data signals $D_T(A)$ and $D_T(B)$.

A limitation of the arrangement of FIG. 1 is that the IQ-mixer 12 in each path combines the I and Q components into a single analog sub-band signal 16. This means that the optical modulator is restricted to modulating only the Real (or In-phase) component of the optical carrier light. No significant modulation of the Imaginary (or Quadrature) component of the optical carrier light is possible. However, as data rates increase, the tolerance for phase noise and non-linear impairments such as self-phase modulation and cross-phase modulation decreases. In order to maintain adequate noise margin for high data-rate long-haul optical transmission in practical networks, independent modulation of both of the Real and Imaginary components of the optical carrier light is important.

Figure 2:
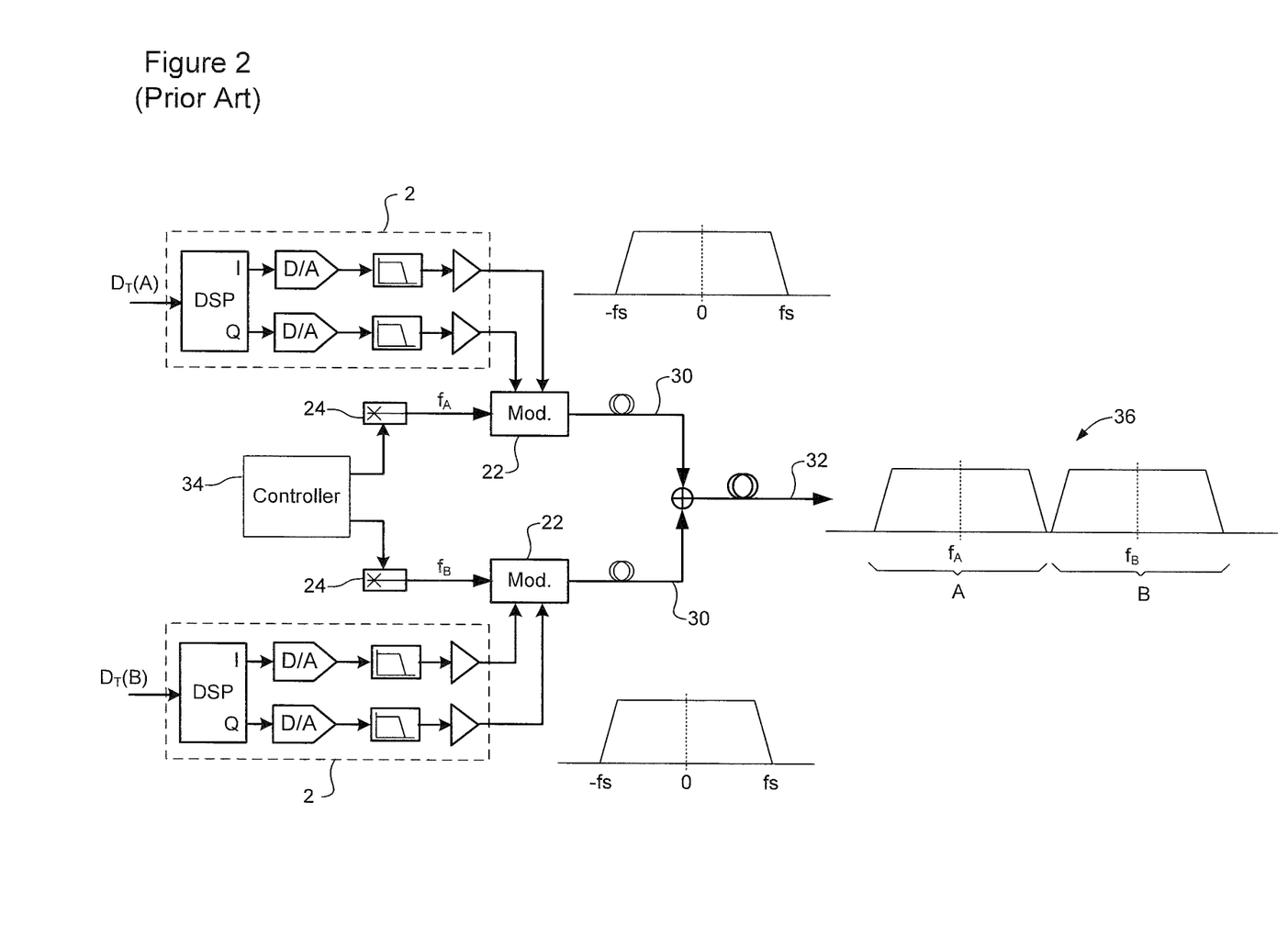
FIG. 2 is a block diagram schematically illustrating elements of an alternative OFDM transmitter known in the art.

FIG. 2 shows an OFDM transmitter in which each path 2 is used to drive a respective optical modulator 22 to generate a corresponding optical sub-band signal 30. The optical sub-band signals are then optically combined to produce a modulated optical signal 32 for transmission. In the transmitter of FIG. 2, each path 2 outputs I and Q (or, equivalently, Phase and Amplitude) analog sub-band drive signals, which means that the Real and Imaginary components of the optical carrier light can be independently modulated. In order to provide spectral separation between the two optical sub-band signals, each modulator 22 receives a CW carrier light from a respective transmitter Local Oscillator (Tx LO) such as a laser. A controller 34 may then be provided to control the frequency difference Δf between the two sub-band carrier lights, so that the combined optical signal has a spectrum 36 in which frequency components of each sub-band lay in respective different spectral regions.

As noted above, because the I and Q components of each sub-band are available for driving the respective sub-band modulator, it is possible to independently modulate I and Q components (or Phase and Amplitude) of the sub-band optical carriers. As such, the OFDM transmitter of FIG. 2 is capable of higher performance than that of FIG. 1. However, this performance improvement is obtained by duplicating the electro-optical components (primarily the lasers 24 and the optical modulators 22), which significantly increases the cost of the transmitter. In addition, since two lasers are used, differential phase noise and line width of each laser can also impair performance.

What is needed is a cost-effective OFDM transmitter in which I and Q components (or Phase and Amplitude) of the optical carrier can be independently modulated.

SUMMARY

An aspect of the present invention provides a method of transmitting a data signal in an optical communications system. The method includes processing the data signal to generate an analog drive signal, wherein the processing comprises applying a first non-linear operation such that frequency components of the drive signal lay in at least two separated spectral bands. An optical carrier light is modulated using the analog drive signal.

A further aspect of the present invention provides A method of Frequency Multiplexing two or more data signals for transmission through an optical communications system. The method includes processing each data signal to generate an In-Phase analog sub-band signal and a Quadrature analog sub-band signal. The analog sub-band signals are combined to generate an In-Phase drive signal and a Quadrature drive signal. An In-Phase component of an optical carrier light is modulated using the In-Phase drive signal, and a Quadrature component of the optical carrier light is modulated using the Quadrature drive signal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present application provides techniques for Orthogonal Frequency Division Multiplexing two or more sub-band signals such that a single set of electro-optical components can be used, while preserving the ability to independently modulate Real and Imaginary components of the optical carrier. For ease of description and illustration, the present techniques will be described below by reference to representative embodiments in which two sub-bands are combined onto a single optical signal. However, those of ordinary skill in the art will be readily capable of extending the described techniques to embodiments involving more than two sub-bands. Thus it will be appreciated that the present invention encompasses embodiments in which two or more sub-bands are combined together and modulated onto an optical carrier.

In general, the present technique provides a methods and systems for electrically combining the I and Q components of each sub-band signal to produce composite I and Q drive signals (I_mod, and Q_mod) which may then be used to drive an optical modulator. Corresponding techniques may be implemented in a receiver to electrically reverse the combining function to enable recovery of the I and Q components of each sub-band signal.

Figure 3:
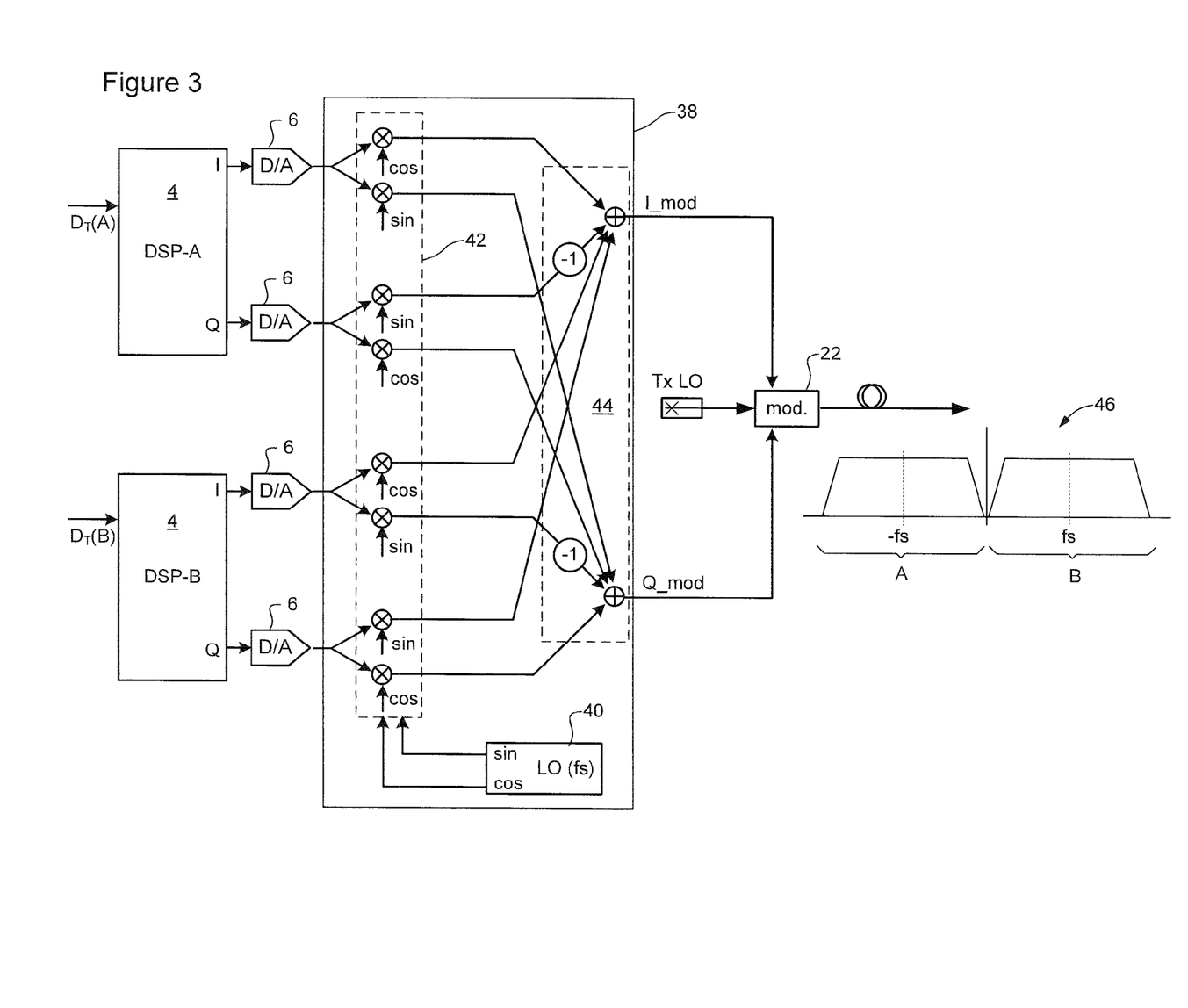
FIG. 3 is a block diagram schematically illustrating elements of an OFDM transmitter in accordance with a representative embodiment of the present invention.

FIG. 3 schematically illustrates elements of an OFDM transmitter incorporating a complex mixer 38 according to a first representative embodiment. In the embodiment of FIG. 3, the complex mixer 38 comprises an oscillator 40, a mixing block 42, and a summation block 44. The oscillator 40 operates to output a pair of Tx mixing signals (denoted as "sin" and "cos") having a frequency of (fs) and a relative phase difference of 90°. The mixing signals may have a sinusoidal waveform if desired, but this is not essential. Satisfactory results can be obtained with other waveforms such as a square wave. The mixing block 42 operates to mix each of the mixing signals with each of the I and Q components of each sub-band. In the case of sinusoidal mixing signals, the mixing block 42 may be provided as a set of conventional RF mixers. In the case of square-wave mixing signals, the mixing block may be provided as a set of samplers driven by the mixing signals. In some embodiments, each sampler may be a simple as a transistor operating as a switch controlled by a respective one of the mixing signals. The summation block 44 comprises a pair of combiners, each of which receives selected mixing products from the mixing block and outputs a respective one of the component of the drive signals I_mod, and Q_mod.

Mathematically, the complex mixer implements the equations:

$$I\_mod = I_A \cos - Q_A \sin + I_B \cos + Q_B \sin$$

and $$Q\_mod = I_A \sin + Q_A \cos - I_B \sin + Q_B \cos$$

where the subscripts "A" and "B" indicate the sub-band.

Figure 4:
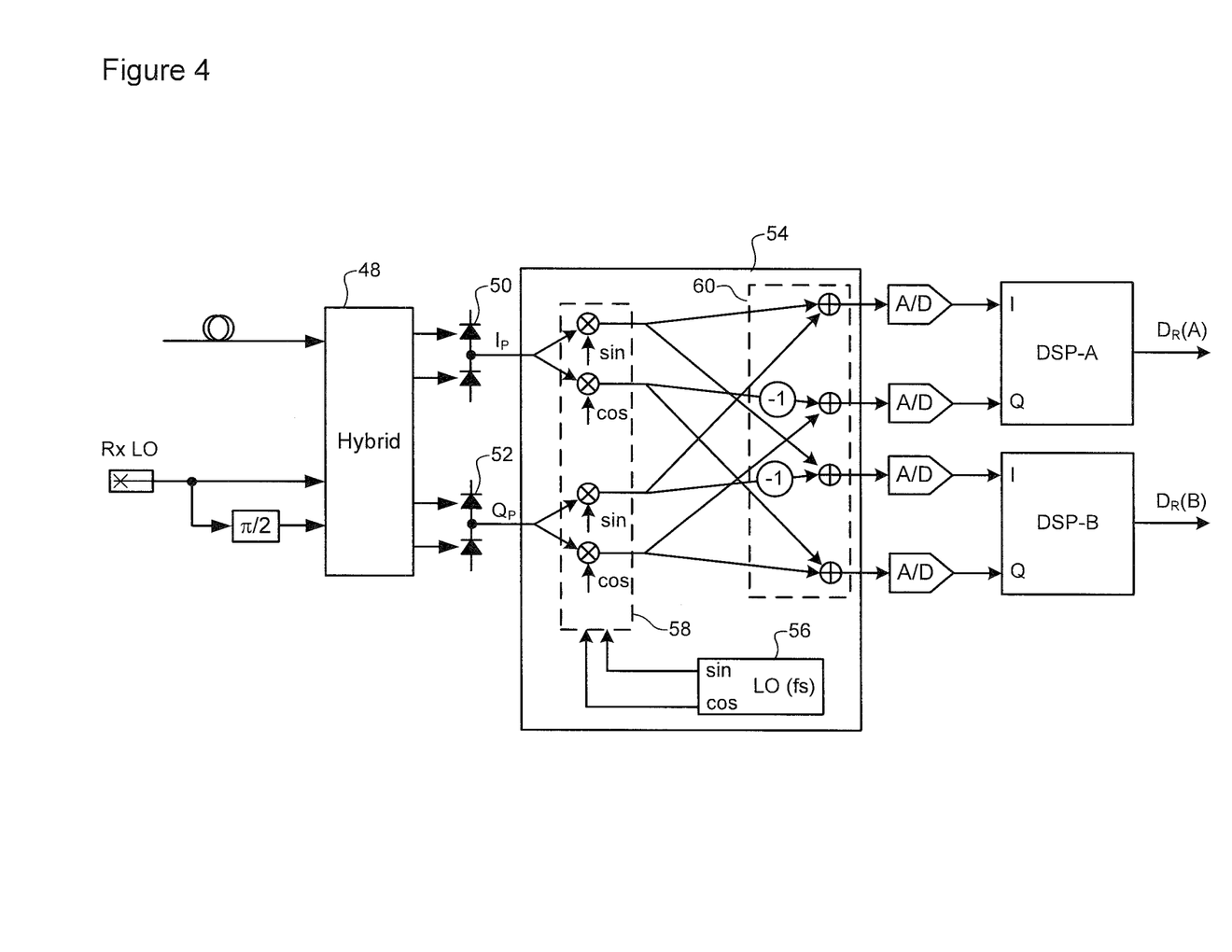
FIG. 4 is a block diagram schematically illustrating elements of an OFDM receiver for recovering sub-band signals from an optical signal generated by the transmitter of FIG. 3.

Referring again to FIG. 3, supplying the drive signals I_mod, and Q_mod to the optical modulator 22 results in a modulated optical signal having a spectrum 46 in which frequency components of each sub-band signal lay in respective different spectral sub-bands that are separated by 2 fs. The original sub-band component signals $I_A$, $Q_A$, $I_B$ and $Q_B$ can be recovered in a receiver by reversing the operations of the mixing block. FIG. 4 schematically illustrates elements of an OFDM receiver incorporating a complex de-mixer for accomplishing this result.

In the embodiment of FIG. 4, the coherent receiver comprises an optical hybrid 48 for mixing an incoming optical signal with a receiver local oscillator (such as a laser) in a known manner. The composite signals output from the optical hybrid 48 are made incident on a pair of photodetectors 50 and 52, which output electrical signals respectively representing In-Phase and Quadrature components of data modulated on the received optical signal. The complex de-mixer 54 processes the photodetector signals $I_P$ and $Q_P$ to generate a set of analog signals corresponding to the sub-band component signals $I_A$, $Q_A$, $I_B$ and $Q_B$ modulated onto the optical signal by the transmitter.

As may be seen in FIG. 4, the complex de-mixer 54 comprises an oscillator 56, a mixing block 58, and a summation block 60. As in the complex mixer of FIG. 3, the oscillator 56 operates to output a pair of Rx mixing signals (denoted herein as "sin" and "cos") having a frequency of (fs) and a relative phase difference of 90°. Preferably, the waveform of the mixing signals is the same as that used in the complex mixer of the transmitter. The mixing block 58 operates to mix the mixing signals with each of the photodetector signals $I_P$ and $Q_P$. The summation block 60 comprises a set of combiners, each of which receives selected mixing products from the mixing block and outputs a respective one of the sub-band component signals $I_A$, $Q_A$, $I_B$ and $Q_B$.

Mathematically, the complex de-mixer 54 implements the equations:

$$A_A = I_P \sin + Q_P \sin$$

$$Q_A = Q_P \cos - I_P \cos$$

$$I_B = I_P \sin - Q_P \sin$$

and $$Q_B = I_P \cos + Q_P \cos$$

The embodiment of FIGS. 3 and 4 is advantageous in that it produces a pair of spectral bands equivalent to that produced by a pair of parallel modulators, as in the embodiment of FIG. 2. However, it suffers a disadvantage that a differential delay in the signal paths downstream of the transmitter mixing block 44 (FIG. 3) cannot be corrected by the transmitter DSP 4 without doubling the number of D/A converters 6 and increasing the complexity of the DSP 4. In practice, moderate amounts of uncorrected differential delay can severely impact performance. The embodiments described below, avoid this problem.

Figure 5:
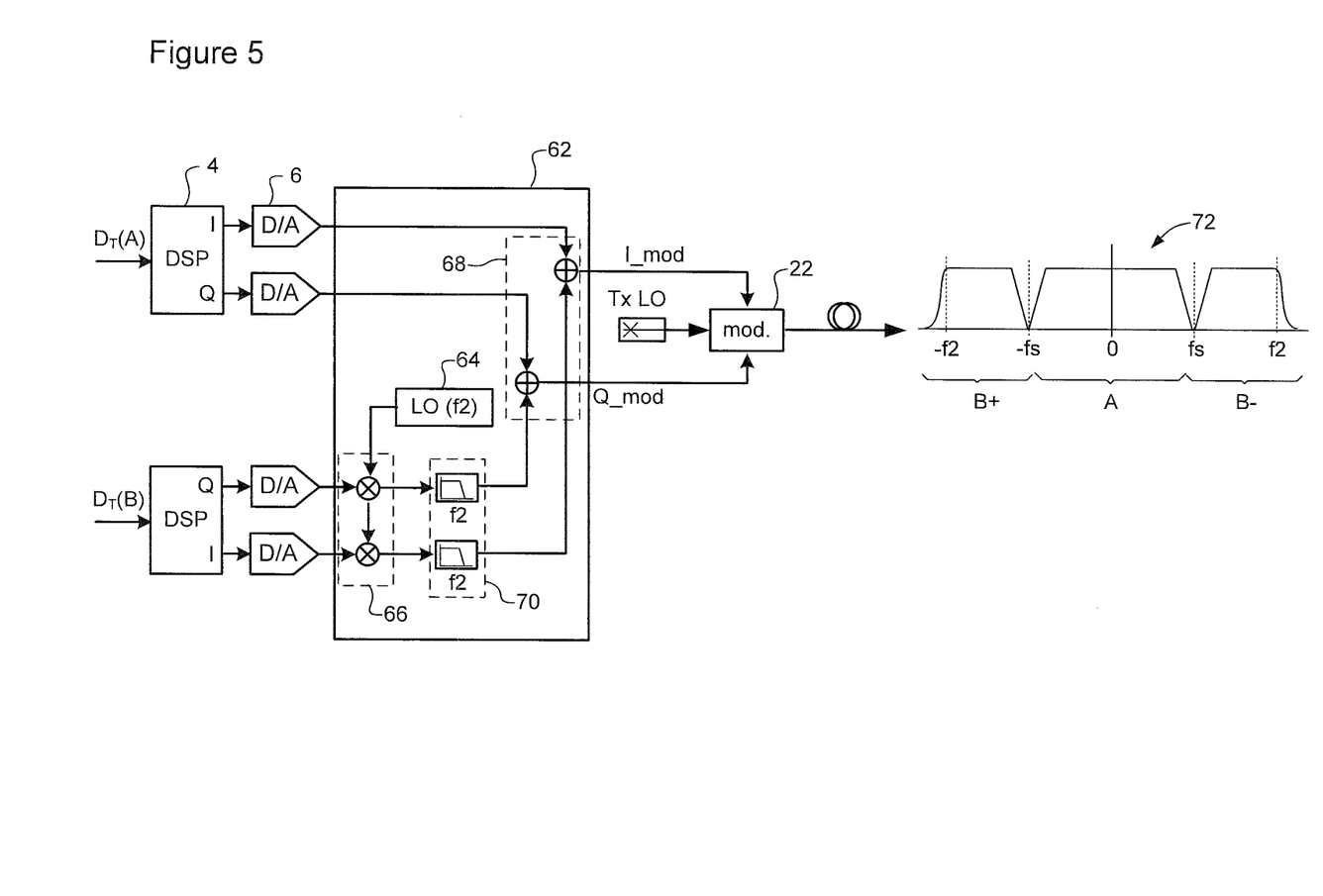
FIG. 5 is a block diagram schematically illustrating elements of an OFDM transmitter in accordance with a second representative embodiment of the present invention.

FIG. 5 schematically illustrates elements of an OFDM transmitter incorporating a complex mixer 62 according to a second representative embodiment. In the embodiment of FIG. 5, the complex mixer 62 comprises an oscillator 64, a mixing block 66, and a summation block 68. The oscillator 64 operates to output a mixing signal having a frequency of (f2). The mixing signal may have a sinusoidal waveform if desired, but this is not essential. Satisfactory results can be obtained with other waveforms such as a square wave. The mixing block 66 operates to mix the mixing signal with the I and Q components of one of the two sub-bands (in this case, sub-band B). The composite signals output from the mixers are then low-pass filtered at 70 using a filter characteristic having a cut-off frequency of f2, and the filtered component signals supplied to the summation block 68. The summation block 68 operates to add respective signal components from each path to generate the drive signals I_mod, and Q_mod.

As in the embodiment of FIG. 3, in the case of a sinusoidal mixing signal, the mixing block 66 may be provided as a set of conventional RF mixers. In the case of a square-wave mixing signal, the mixing block may be provided as a set of samplers driven by the mixing signals. In some embodiments, each sampler may be a simple as a transistor operating as a switch controlled by a respective one of the mixing signals.

As will be appreciated, the mixing block 66 operates to up-convert each of the B sub-band signal components to an IF band centered at 12, and the Low-Pass filters 70 attenuate signal components lying above this frequency. On the other hand, the A sub-band signal components remain at baseband. Consequently, supplying the drive signals I_mod, and Q_mod to the optical modulator results in a modulated optical signal having a spectrum 72 in which frequency components of sub-band A lay in a baseband spectral region bounded by ±fs, whereas frequency components of sub-band B are split between two separated spectral bands. In particular, the negative frequency components of sub-band B are located in a spectral band between fs and f2, and the positive frequency components of sub-band B are located in a spectral band between −fs and −f2.

Figure 6:
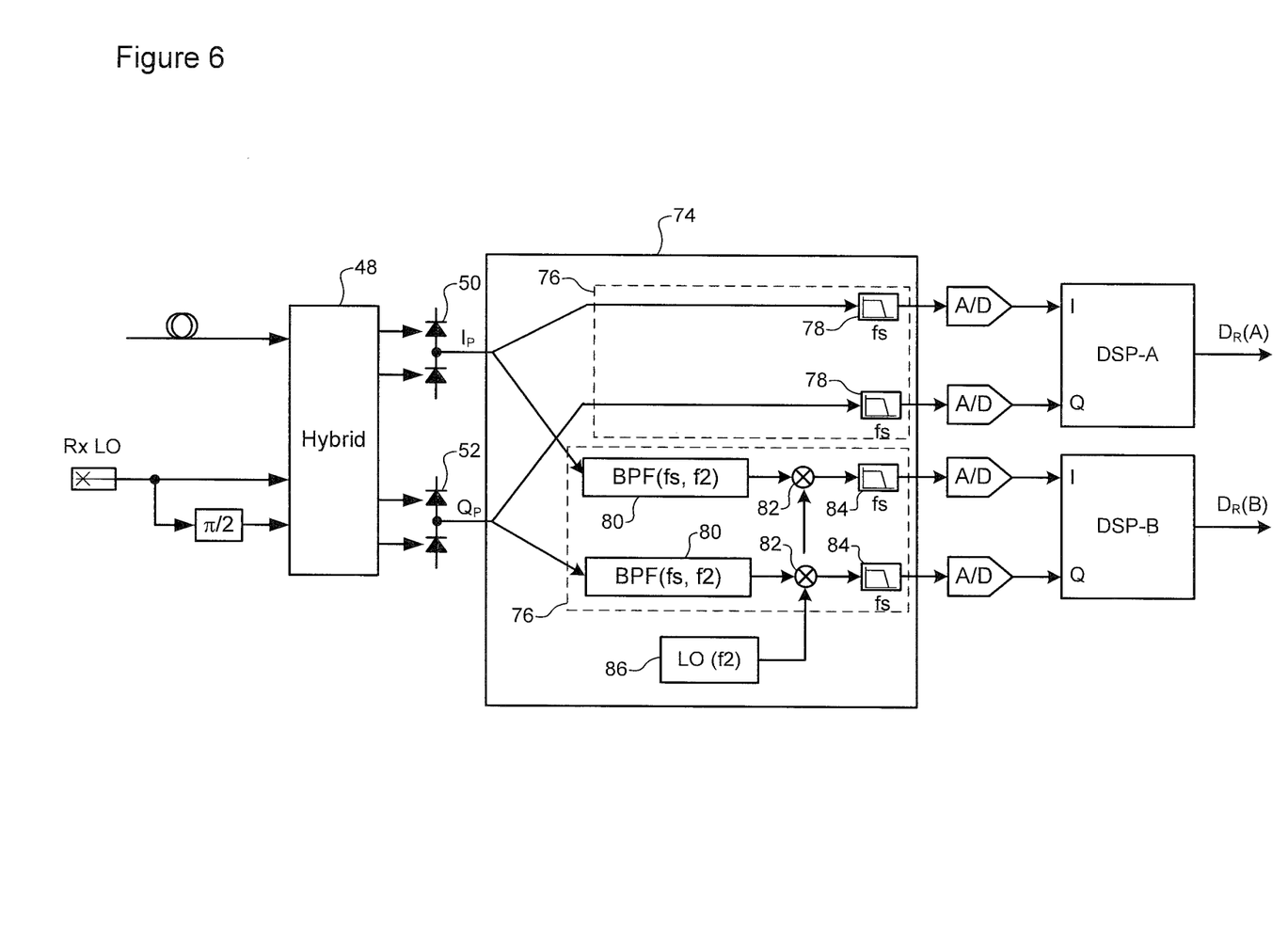
FIG. 6 is a block diagram schematically illustrating elements of an OFDM receiver for recovering sub-band signals from an optical signal generated by the transmitter of FIG. 5.

In this respect, the term "separated spectral bands" means that the two spectral bands are separated from each other by one or more spectral bands that may contain frequency components of at least one other sub-band. Thus, in the example of FIG. 5, the spectral bands carrying frequency components of sub-band B are separated from each other by a spectral band containing frequency components of sub-band A. The original sub-band component signals $I_A$, $Q_A$, $I_B$ and $Q_B$ can be recovered in a receiver by reversing the operations of the mixing block. FIG. 6 schematically illustrates elements of an OFDM receiver incorporating a complex de-mixer for accomplishing this result.

As in the embodiment of FIG. 4, the coherent receiver of FIG. 6 comprises an optical hybrid 48 for mixing an incoming optical signal with a receiver local oscillator (such as a laser) in a known manner. The composite signals output from the optical hybrid are made incident on a pair of photodetectors 50 and 52, which output electrical signals respectively representing In-Phase and Quadrature components of data modulated on the received optical signal. The complex de-mixer 74 processes the photodetector signals $I_P$ and $Q_P$ to generate a set of analog signals corresponding to the sub-band component signals $I_A$, $Q_A$, $I_B$ and $Q_B$ modulated onto the optical signal by the transmitter.

As may be seen in FIG. 6, the complex de-mixer 74 supplies each of the photodetector signals $I_P$ and $Q_P$ to respective paths 76, each of which processes the photodetector signals $I_P$ and $Q_P$ to recover components of a respective one the two transmitted sub-bands. As noted above, frequency components of sub-band A lay in a baseband spectral region of the optical signal. Accordingly, the sub-band component signals $I_A$ and $Q_A$ can be recovered by filtering each of the photodetector signals $I_P$ and $Q_P$ using Low-Pass filters 78 having a cut-off frequency of fs.

Figure 7A:
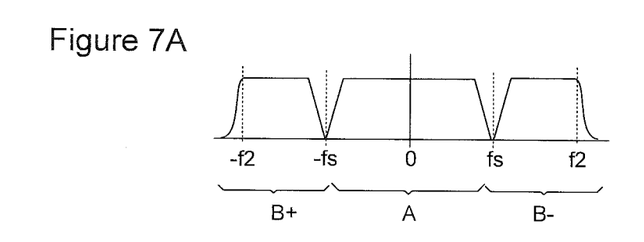
FIGS. 7A-7D are spectral diagrams illustrating operation of the receiver of FIG. 6.
Figure 7B:
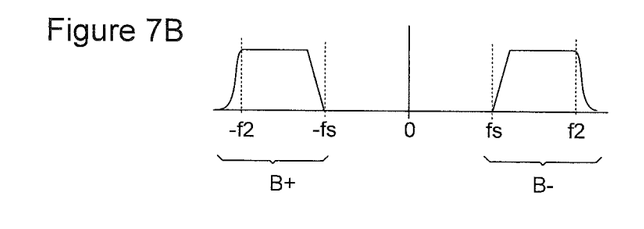
Figure 7C:
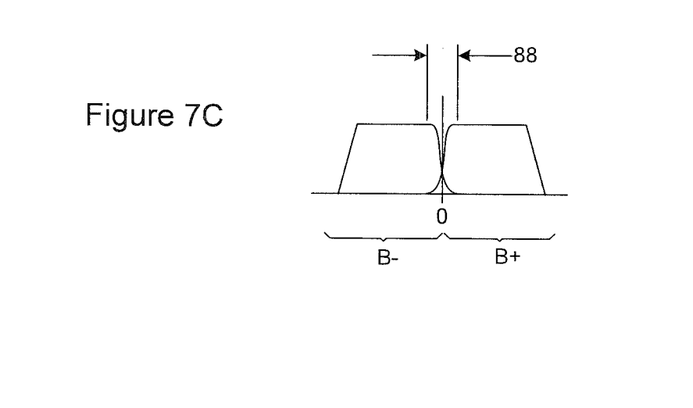
Figure 7D:
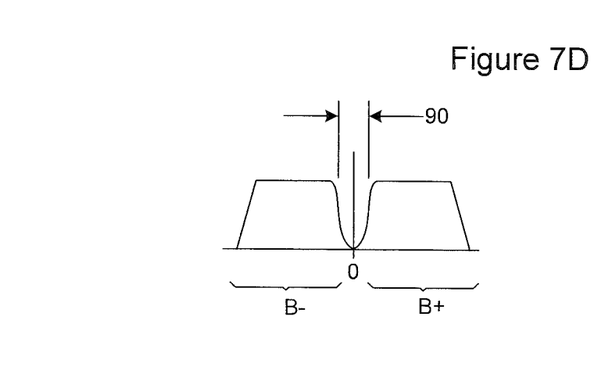

As noted above, frequency components of sub-band B lay in separated spectral regions at −fs to −f2 and fs to f2. Accordingly, the sub-band B path comprises a pair of band-pass filters 80 having a pass band between fs and f2, cascaded with respective mixers 82 and low-pass filters 84. Referring to FIG. 7, the photodetector signals $I_P$ and $Q_P$ have a spectrum as shown in FIG. 7A. The band-pass filters 80 attenuate out-of-band frequency components to yield the spectrum shown in FIG. 7B. The mixers 82 operate to mix the filtered photodetector signals $I_P$ and $Q_P$ with a mixing signal having a frequency of f2, which is generated by a suitable oscillator 86. Preferably, the waveform of the mixing signals is the same as that used in the complex miser of the transmitter. Low pass filtering (at 84) the composite signals output from the mixers using a filter characteristic having a cut-off frequency at fs yields a baseband spectrum in which the positive and negative frequency components of sub-band B are properly ordered, as may be seen in FIG. 7C. As such, it will be seen that the sub-band B path 76 effectively recombines the frequency components of sub-band B, and so recovers the desired sub-band component signals $I_B$ and $Q_B$.

Figure 8:
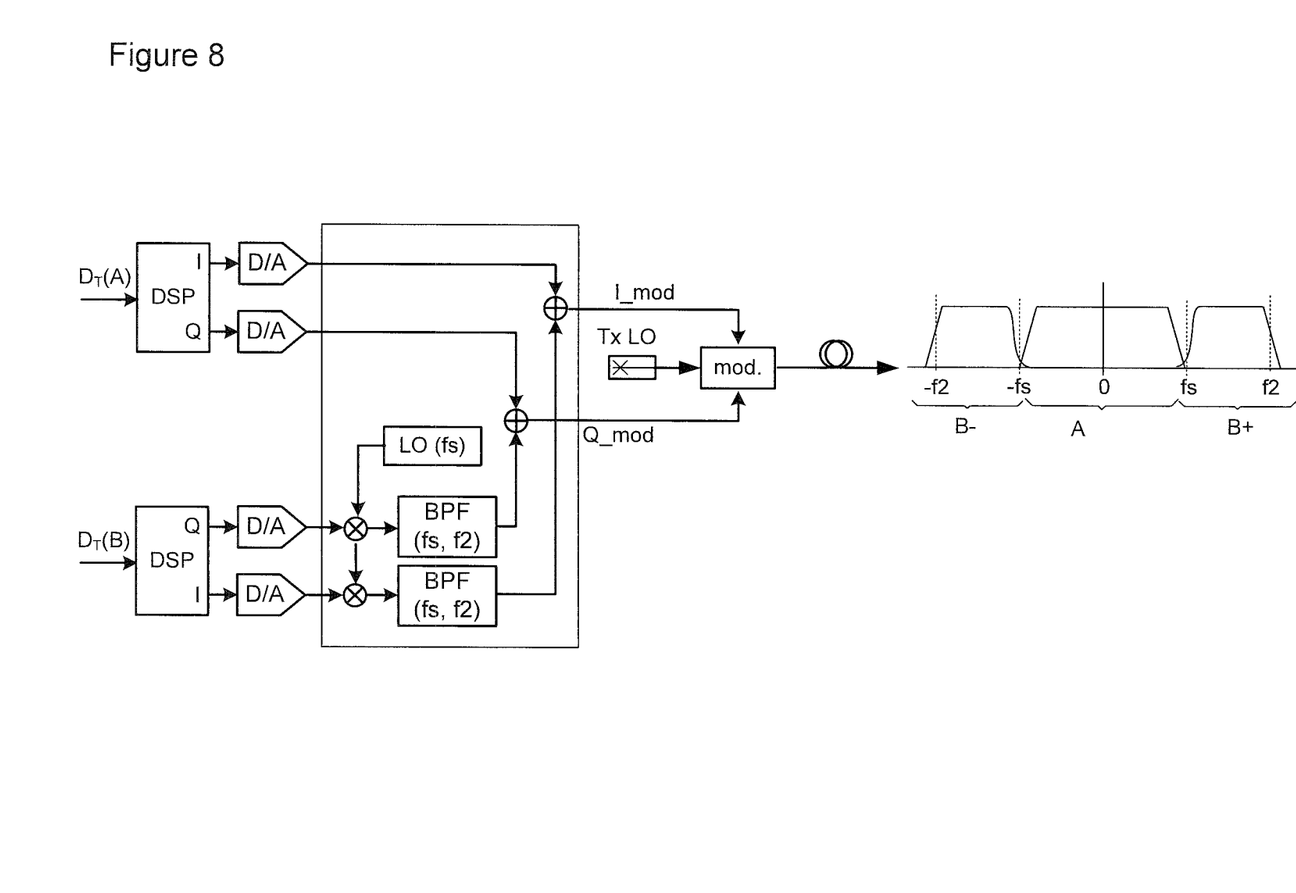
FIG. 8 is a block diagram schematically illustrating elements of an OFDM transmitter in accordance with a third representative embodiment of the present invention.
Figure 9:
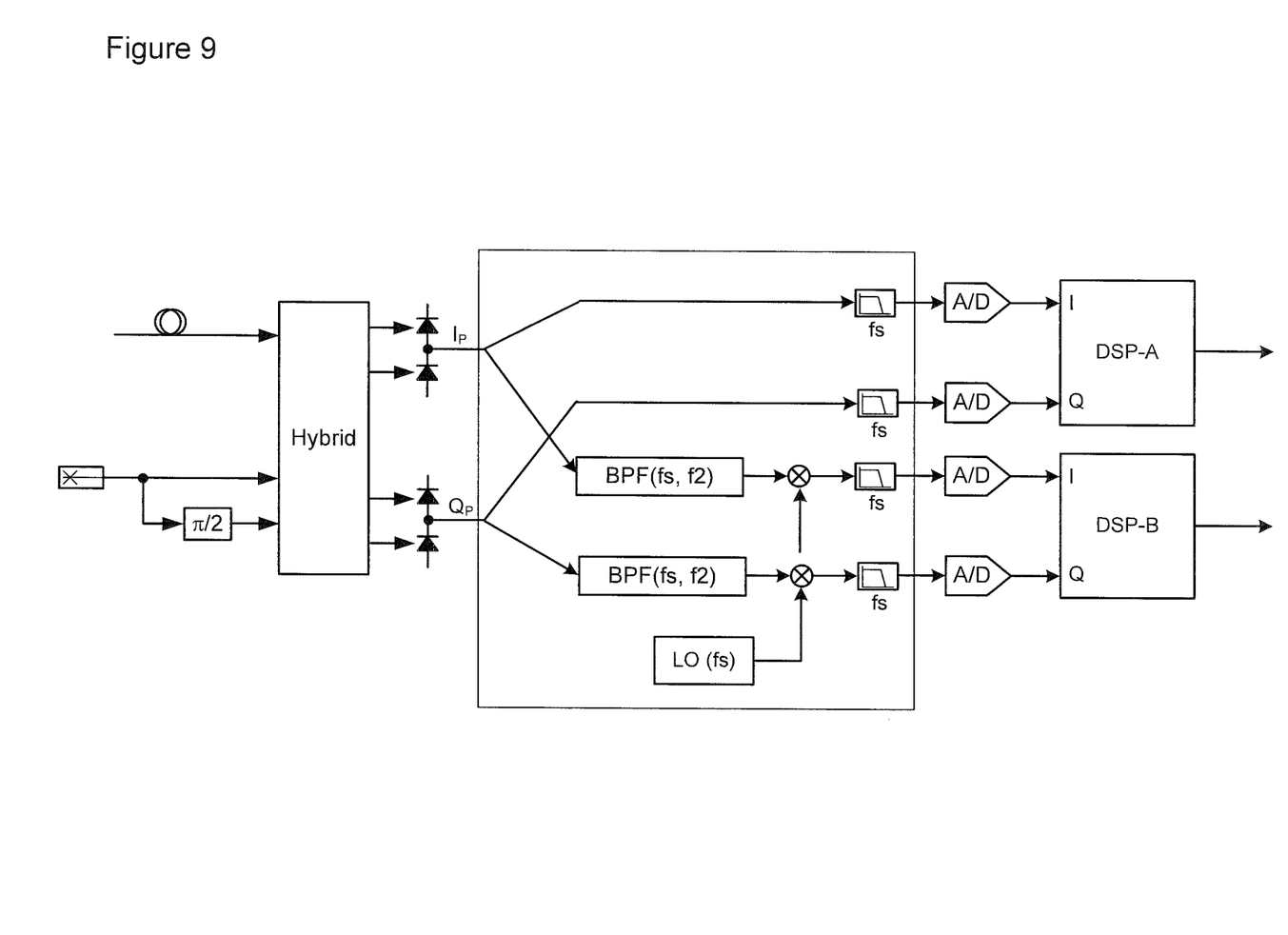
FIG. 9 is a block diagram schematically illustrating elements of an OFDM receiver for recovering sub-band signals from an optical signal generated by the transmitter of FIG. 7.

FIGS. 8 and 9 illustrate a third embodiment, which is closely similar to the embodiment of FIGS. 5-7, and which operates in substantially the same manner. The only major exception is that, in the embodiment of FIGS. 8 and 9, the mixing signals generated by the oscillators 64 and 86 in the transmitter and receiver have a frequency of fs rather than f2. This results in negative frequency components of sub-band B being located in a spectral band between −fs and −f2, while the positive frequency components of sub-band B are located in a spectral band between fs and f2.

As noted above, in the embodiments of FIGS. 5-9, one of the sub-bands (in this case, sub-band B) is split into two separated spectral bands of the modulated optical signal, and then recombined in the receiver. As may be seen in FIG. 7C, the recombined spectrum contains an overlap region 88 near DC (0 Hz). In addition, optical line effects such as PMD can create the need for a transfer function that has a discontinuity at the "seam" (at DC) where the two spectral bands are to be joined. This may occur, for example, when the value of PMD and/or polarization rotation, varies across frequency. If the receiver DSP implements a compensation function capable of tracking and compensating this transfer function, then there is no penalty from the discontinuity. However, polarization compensation circuits that either operate in the time domain or operate in the frequency domain but with a limited number of taps may not fully compensate a step discontinuity.

For example, U.S. Pat. No. 8,005,368 teaches a frequency domain LMS equalizer in which the number of taps are limited to limit the coefficient noise and allow rapid tracking. The entire content of the U.S. Pat. No. 8,005,368 is hereby incorporated herein by reference. Because of the limited number of taps, complete compensation of the discontinuity of DC may not be possible. However, the system of U.S. Pat. No. 8,005,368 may be modified to implement separate time windowing and LMS calculations for each of the positive and negative frequency bands. Splitting the LMS calculations in this manner avoids the limitations imposed by the low number of taps, and enables full compensation of a transfer function with a discontinuity at DC. Thus, digital compensation methods can be designed that tolerate a discontinuity in the transfer function, while still limiting the coefficient noise.

As noted above, when the positive and negative frequency components of a split sub-band are recombined, there is an overlap region or seam where the two spectral bands are to be joined. This seam has finite width due to the finite roll-off of the analog band-pass filters. At the receiver, these two halves are added together as analog signals; adding in phase in the overlap region.

Line effects such as PMD can vary the delay of one half relative to the other. The resulting differential delay causes a phase shift with respect to the mixing signals in the receiver, which produces a complex rotation with respect to each other. In the worst case of a phase shift of $\pi$ (180°) at some frequency, the overlapping frequency components will act to cancel each other, causing a severe dip in the spectrum at that frequency. When the resulting analog signal is digitally compensated, ASE noise is enhanced causing a significant penalty.

This problem may be mitigated by designing the analog filters with a steeper roll-off to contain the problem to a smaller spectral region.

An alternative approach is use a mixing signal frequency that is lower in the receiver than in the transmitter. In the embodiments described above, the mixing signals used in the transmitter and the receiver have the same frequency. Thus, for example, if the transmitter mixing signals have a frequency Fs of 20 GHz, then the frequency of the receiver mixing signals will also be 20 GHz. However, it is possible to use a 20 GHz mixing signal in the transmitter, with an 18.75 GHz mixing signal in the receiver. As may be seen in FIG. 7D, this leaves a gap 90 of 2 times 1.25 GHz where the seam should be.

After conversion to digital samples, the split LMS can compensate each spectral block separately, including the complex phase rotation between the (now separate) portions that will overlap when the two halves are joined. Then, a digital frequency shift of 1.25 GHz towards DC can be applied to each half and the two portions added using frequency-domain techniques known in the art, forming the desired single signal with a seam at DC. In this case, the digital addition is always in-phase because the overlapping portions have been separately compensated.

This digital shifting method uses a little more bandwidth, so the spectral shape of the signal must be designed to allow this extra bandwidth with respect to the D/A converter sampling rate.

A further alternative method is to offset the two halves of the spectrum in the Tx DSP, and use equal frequencies as the Tx and Rx mixing signals. The digital methods described above may then be used at the receiver to reassemble the halves at the appropriate frequencies. This has the added benefit of leaving a gap of, say, 2.5 GHz around DC where there is no signal from the DACs. That allows the analog circuits to not need to respond at low frequencies, reducing the size of the analog components. Indeed, this same digital offset method is valuable on the baseband signal through the cost and size reduction for the analog drive circuits. This method can be used in ordinary transmitters that are not using mixing.

Digital frequency shifting can be performed in the time domain by multiplication by a complex sinusoid. In the frequency domain, frequency shifts that are N times the FFT tap increment are achieved by reconnection of the wires carrying the spectral array to locations that are N taps shifted in the array.

To avoid issues due to the Tx laser and Rx laser not having exactly the same frequency, which could shift the received signal spectra before the nonlinear digital shift, it is desirable that the "gap" be filled with duplicate spectrum. For example, the spectrum from −1.25 GHz to +18.75 GHz can be shifted right (to higher frequencies) by 1.25 GHz to occupy 0 to 20 GHz, and the spectrum from +1.25 GHz to −18.75 GHz shifted left (to lower frequencies) by 1.25 GHz to occupy 0 to −20 GHz. Some of the frequencies around DC will be attenuated due to the small components of the analog circuits, but the remaining duplicated spectra will provide room for laser frequency transients to act without performance penalty.

In the embodiments of FIGS. 3-8, the complex mixer includes a combiner block (38, 68) for adding respective signal components from each sub-band to generate the modulator drive signals I_mod and Q-mod. If desired, this function may instead be implemented in the modulator 22 itself, rather than the complex mixer. For example, multiple electrode modulators are known, which comprise a plurality of electrodes, each of which can be individually driven by a respective drive signal. The total modulation is the sum of the respective modulations produced by each electrode. Accordingly, the desired combining of signal components can be obtained by supplying each signal component to a respective set of electrodes of a multiple electrode modulator.

The embodiments of the invention described above are intended to be illustrative only. The scope of the invention is therefore intended to be limited solely by the scope of the appended claims.

We claim:

1. A method of transmitting a data signal in an optical communications system, the method comprising:
    processing the data signal to generate In-Phase and Quadrature analog drive signals, the processing including mixing In-Phase and Quadrature components of the

9 data signal with a mixing signal having a first predetermined frequency to generate corresponding In-Phase and Quadrature composite signals, and bandpass filtering the In-Phase and Quadrature composite signals using a filter characteristic having a cut-off frequency equal to the first predetermined frequency to generate the In-Phase and Quadrature analog drive signals such that frequency components of the data signal lay in at least two separated spectral bands, each spectral band having a respective bandwidth that is less than a bandwidth of the data signal; and modulating an optical carrier light using the In-Phase and Quadrature analog drive signals.

2. The method of claim 1, further comprising:

detecting In-Phase and Quadrature components of the modulated optical carrier light, and generating corresponding In-Phase and Quadrature detector signals; and processing the In-Phase and Quadrature detector signals to recover the analog sub-band signals; wherein the processing comprises:
 supplying the In-Phase and Quadrature detector signals to at least two paths, each path corresponding to a respective one of the data signals; and
 for at least one of the data signals:
  band-pass filtering each of the In-Phase and Quadrature detector signals using a filter characteristic having a second predetermined pass-band to generate corresponding filtered detector signals;
  mixing each of the filtered detector signals with an Rx mixing signal having a second predetermined frequency to generate corresponding composite signals; and
  low-pass filtering the composite signals using a filter characteristic having a cut-off frequency equal to a third predetermined frequency to generate corresponding In-Phase and Quadrature filtered sub-band signals.

3. The method of claim 2, wherein the first and second predetermined frequencies are equal.

4. The method of claim 2, wherein the second and third predetermined frequencies are equal.

5. The method of claim 2, wherein the first predetermined frequency is greater than the second predetermined frequency.

6. The method of claim 2, wherein the first and second predetermined pass-bands are equal.

7. A transmitter configured to transmit a data signal in an optical communications system, the transmitter comprising:
 a processor configured to process the data signal to generate In-Phase and Quadrature analog drive signals, including respective mixers configured to mix In-Phase and Quadrature components of the data signal with respective Tx mixing signals having a first predetermined frequency to generate corresponding In-Phase and Quadrature composite signals, and respective band-pass filters configured to filter the In-Phase and Quadrature composite signals to generate the In-Phase and Quadrature analog drive signals such that frequency components of the data signal lay in at least two separated spectral bands, each spectral band having a respective bandwidth that is less than a bandwidth of the data signal; and
 a modulator configured to modulate an optical carrier light using the In-Phase and Quadrature analog drive signals,

10 wherein the respective band-pass filters have a first predetermined pass-band having a cut-off frequency corresponding to the first predetermined frequency.

8. The transmitter of claim 7, wherein the processor comprises:
 a digital signal processor configured to digitally processing each one of the set of the two or more data signals to generate respective In-Phase and Quadrature sample streams for each digital data signal; and
 a respective digital-to-analog converter configured to process each sample stream to generate corresponding In-Phase and Quadrature analog sub-band signals.

9. A receiver configured to receive an optical signal received through an optical communications system from a transmitter, the receiver comprising:
 a photodetector block configured to detect In-Phase and Quadrature components of the optical signal, and to generate corresponding In-Phase and Quadrature detector signals, the optical signal comprising two or more frequency multiplexed sub-band signals, at least one sub-band signal having frequency components lying in at least two separated spectral bands of the optical signal, each of the at least two separated spectral bands having a respective bandwidth that is less than a bandwidth of the sub-band signal; and
 a complex demixer configured to process the In-Phase and Quadrature detector signals to recover the sub-band signals, wherein the complex demixer comprises:
  at least two paths, each path corresponding to a respective one of the sub-band signals and receiving the In-Phase and Quadrature detector signals; and
  in each path corresponding to a sub-band signal having frequency components lying in at least two separated spectral bands of the optical signal:
   a respective band-pass filter configured to filter each of the In-Phase and Quadrature detector signals, each band-pass filter having a filter characteristic including a predetermined pass-band to generate corresponding filtered detector signals;
   a respective mixer configured to mix each of the filtered detector signals with an Rx mixing signal having a first predetermined frequency to generate corresponding composite signals; and
   a respective low-pass filter configured to filter each of the composite signals, each low-pass filter having a filter characteristic including a cut-off frequency equal to a second predetermined frequency to generate corresponding In-Phase and Quadrature filtered sub-band signals.

10. A method of frequency demultiplexing two or more sub-band signals modulated on an optical signal received through an optical communications system from a transmitter, the method comprising:
 a photodetector block detecting In-Phase and Quadrature components of the optical signal, and generating corresponding In-Phase and Quadrature detector signals, the optical signal comprising two or more frequency multiplexed sub-band signals, at least one sub-band signal having frequency components lying in at least two separated spectral bands of the optical signal, each of the at least two separated spectral bands having a respective bandwidth that is less than a bandwidth of the sub-band signal; and
 a complex demixer processing the In-Phase and Quadrature detector signals to recover the sub-band signals, wherein the processing comprises:

supplying the In-Phase and Quadrature detector signals to at least two paths, each path corresponding to a respective one of the sub-band signals; and for a sub-band signal having frequency components lying in at least two separated spectral bands of the optical signal:

band-pass filtering each of the In-Phase and Quadrature detector signals using a filter characteristic having a predetermined pass-band to generate corresponding filtered detector signals;

mixing each of the filtered detector signals with an Rx mixing signal having a first predetermined frequency to generate corresponding composite signals; and low-pass filtering the composite signals using a filter characteristic having a cut-off frequency equal to a second predetermined frequency to generate corresponding In-Phase and Quadrature filtered sub-band signals.

11. The receiver as claimed in claim 9, wherein the complex demixer further comprises a second path corresponding to a sub-band signal having frequency components lying in a single spectral band of the optical signal, the second path having a respective low-pass filter configured to filter each of the In-Phase and Quadrature detector signals, each low-pass filter having a filter characteristic including a cut-off frequency equal to the second predetermined frequency to generate corresponding In-Phase and Quadrature filtered sub-band signals.

12. The receiver as claimed in claim 11, further comprising a digital signal processor configured to process the In-Phase and Quadrature filtered sub-band signals from each path of the complex demixer to recover a data signal encoded in the sub-band signals modulated on the modulated optical carrier light.

13. The method as claimed in claim 10, further comprising, for sub-band signals having frequency components lying in a single spectral band of the optical signal, low-pass filtering each of the In-Phase and Quadrature detector signals using a filter characteristic having a cut-off frequency equal to the second predetermined frequency to generate corresponding In-Phase and Quadrature filtered sub-band signals.

14. The method as claimed in claim 13, further comprising a digital signal processor processing the In-Phase and Quadrature filtered sub-band signals corresponding to each sub-band signal to recover a data signal encoded in the sub-band signals modulated on the modulated optical carrier light.

* * * * *